April 25, 1939.  J. H. JEFFREE  2,155,659
LIGHT MODULATING DEVICE
Filed Feb. 27, 1935  3 Sheets-Sheet 1
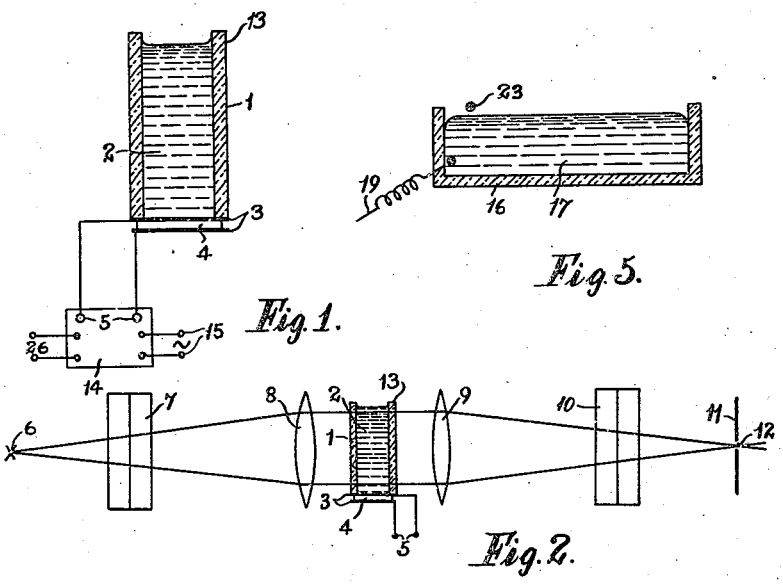
Fig.1.  Fig.5.
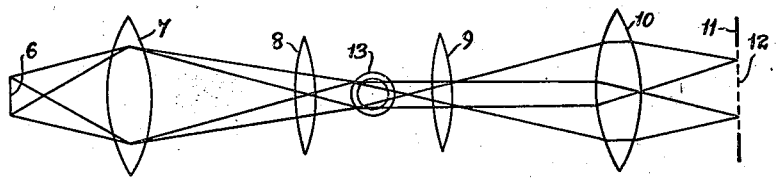
Fig.2.
Fig.3.
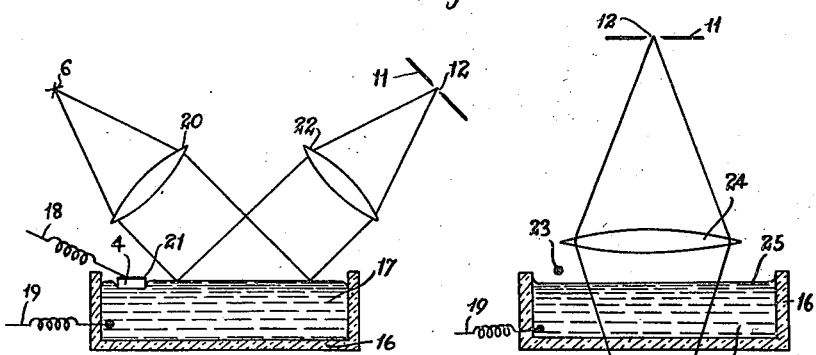
Fig.4.  Fig.6.
John Henry JEFFREE
Inventor, April 25, 1939.  J. H. JEFFREE  2,155,659
LIGHT MODULATING DEVICE
Filed Feb. 27, 1935  3 Sheets-Sheet 2

John Henry JEFFREE
Inventor

April 25, 1939.  J. H. JEFFREE  2,155,659
LIGHT MODULATING DEVICE
Filed Feb. 27, 1935  3 Sheets-Sheet 3
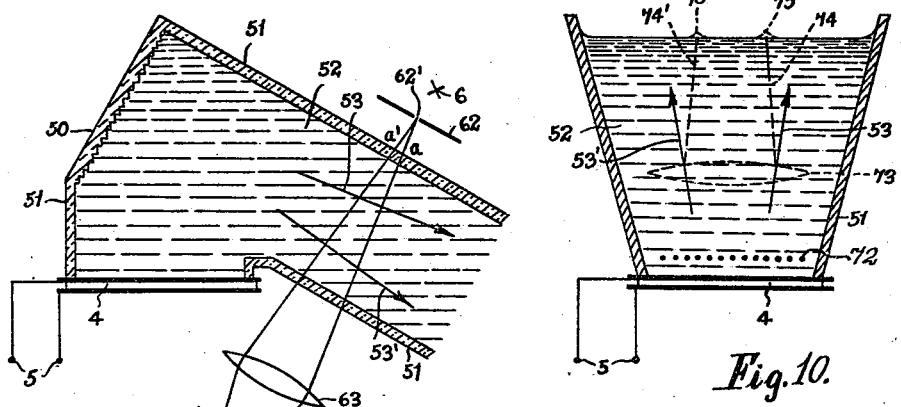
Fig. 9.
Fig. 10.
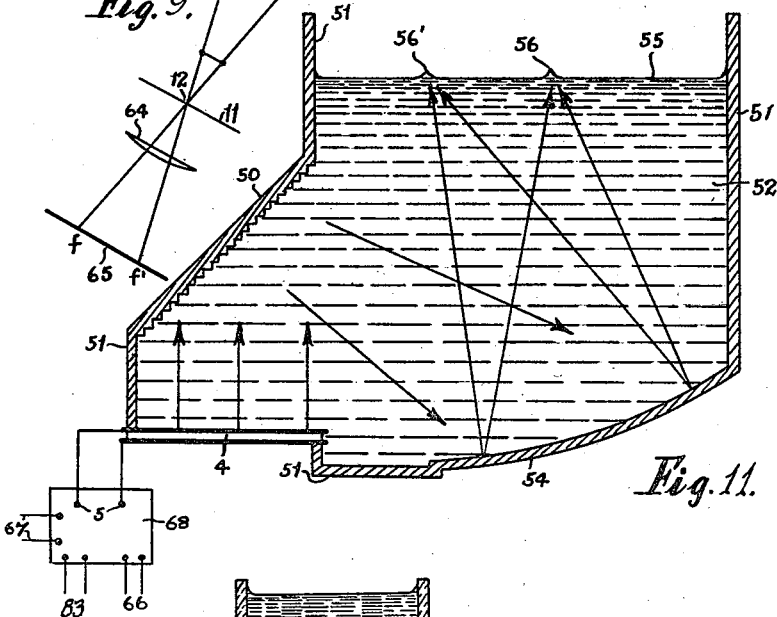
Fig. 11.
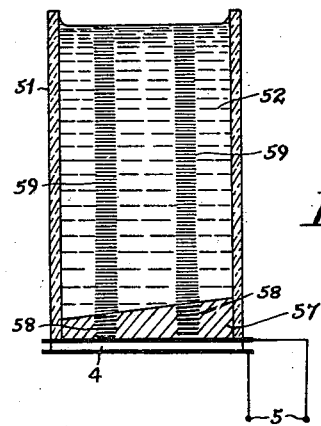
Fig. 12.
John Henry JEFFREE
Inventor,
By: Dr. J. Oppenheimer
Atty.

Patented Apr. 25, 1939

2,155,659

UNITED STATES PATENT OFFICE 2,155,659

LIGHT MODULATING DEVICE

John Henry Jeffree, Bray-on-Thames, England, assignor to Scophony Limited, London, England, a company of Great Britain Application February 27, 1935, Serial No. 8,451
In Great Britain March 3, 1934

14 Claims. (Cl. 88—61)

This invention relates to light modulating devices such as may be used in television, sound recording and for other purposes.

The present invention makes use of the principle that when high frequency mechanical waves are caused to traverse a body forming part of an optical system, they bring about in general retardations and accelerations of the wave front of a beam of light passing through or reflected from the body, these retardations and accelerations corresponding to the regions of compression and rarefaction or of varying displacement of the body produced by the waves. Owing to the regular spacing of these regions, corresponding to the wavelength employed, there can be produced optical effects similar to those caused by a diffraction grating.

If the retardation and acceleration of the light thus produced be of appropriate magnitude, the central beam may be extinguished by interference between the advanced and retarded portions of the optical wave front and all the light is then thrown into the diffraction spectra. Other magnitudes of retardation and acceleration produce partial extinction of the central beam.

It is the object of the present invention to apply this partial or complete extinction to the purpose of producing modulation of a light beam simultaneously in accordance with a plurality of varying influences.

Other objects of the invention will appear from the following description and the appended claims.

Figure 7:
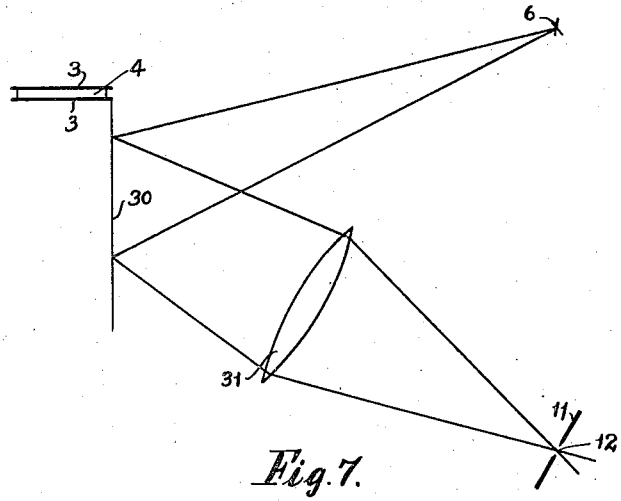
Figure 8:
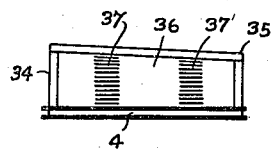
Figure 13:
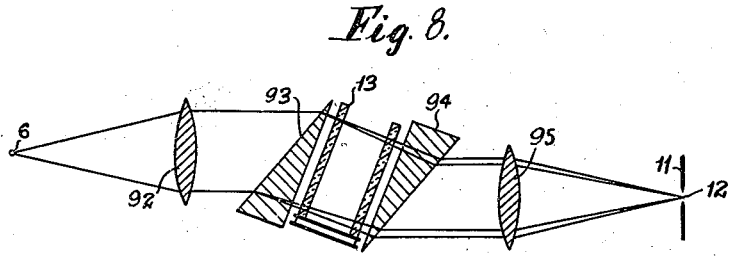
Figure 14:
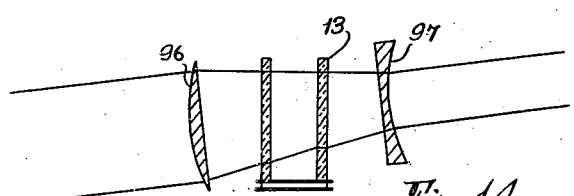

The invention will be described by way of example with reference to the accompanying drawings, in which Fig. 1 shows in section a wave-bearing body suitable for use in one form of light modulator which, although not broadly claimed in the present application, nevertheless illustrates certain of the principles which are made use of in carrying out the invention, Figs. 2 and 3 show diagrammatically an optical system using the apparatus illustrated in Fig. 1, Fig. 2 being a side view with some part in section and Fig. 3 being a view in plan of the system, Figs. 4, 5, 6 and 7 show more schematically modifications also in section of part or parts of the apparatus shown in Figs. 2 and 3, Fig. 8 represents a device of the kind illustrated in Fig. 1, modified so as to be capable of operating in accordance with the present invention, Figs. 9 to 11 show diagrammatically and in section embodiments of the invention in which use is made of diffraction of mechanical waves, Fig. 12 shows in section a modification of the device of Fig. 8 according to a feature of this invention and Figs. 13 and 14 show diagrammatically and partly in section two forms of optical correcting systems which may be used in carrying out the present invention.

Referring now to the drawings, Fig. 1 shows a view in section of a vessel 13 having walls 1 of glass or similar transparent material, and a base of metallic layers 3 in between which is held by suitable means a piezo-electric crystal 4. Thus the crystal may be a thin quartz plate cut perpendicular to its electric axis, having each face coated with aluminium foil, or gilded. The vessel 13 contains a transparent liquid 2 such as water or paraffin oil. If high frequency electrical oscillations are applied across the terminals 5 which are connected to the metallic plates 3, the piezo-electric crystal 4 will vibrate mechanically in sympathy with the applied electrical oscillations. These vibrations will pass into the liquid 2, and a series of compressional waves, of intensity corresponding to the magnitude of the electric oscillations on the plates 3, will move up the vessel at a speed depending on the nature of the liquid contained therein. If the mechanical waves are modulated in amplitude by modulating the high frequency potential applied across the terminals 5, the intensity of the compressions and rarefactions will be correspondingly changed. The modulating frequencies may be applied to the terminals 26 of the modulating device shown diagrammatically at 14, and high frequency potentials to the terminals 15: a modulated high frequency will then appear across the terminals 5. If now a light beam is passed through the cell in a direction substantially parallel to the major surfaces of the crystal 4, that is substantially at right angles to the direction of propagation of the waves in the liquid 2, and if either the central or outer portions of the emergent beam are selected, the resulting beam will change in intensity in accordance with the applied modulations.

Figs. 2 and 3 show diagrammatically an optical system for use with the cell 13 shown in Fig. 1. Light from a source 6, preferably longer in the plane of Fig. 3 than in that of Fig. 2 passes through the cylindrical lens 7 and the spherical lens 8 and thence through the cell 13; the spherical lens 9 and the cylindrical lens 10 in conjunction with the cell 13 itself (acting as a cylindrical lens) serve to form an image of the source 6 on the aperture 12 of the diaphragm 11. The cell 13 may be of other than circular cross-sectional area. In cases where it has a rectangular cross-section, it will clearly have no focussing effect on the beam. The aperture 12 may be elongated in the same direction as the light source 6.

The beam of light passing through the aperture 12 is modulated in accordance with the modulations of the mechanical waves propagating through the cell 13, the diffraction spectra produced by the waves in the liquid 2 being arrested by the diaphragm 11.

The lenses 7 and 10 may be omitted if desired. It is, however, not usually practicable to construct a cell of large dimensions, the chief restriction being in the direction of its cross-sectional area as indicated in Fig. 3. It is in order that this restriction should not materially lessen the amount of light available, that the cylindrical lenses 7 and 10 of Figs. 2 and 3 are used in this example. They serve to produce an increased condensation of the light in the plane of Fig. 3. In the plane of Fig. 2 it is however advantageous to have the cell long (for reasons which will be brought forward later) and extra condensing power in this plane beyond that given by the spherical lenses 8 and 9, is not usually required.

In Fig. 4 is shown an optical system using a different form of light modulator from that shown in Fig. 1. A suitable quantity of mercury 17 in a vessel 16 has waves produced on its surface by oscillation of the piezo-electric crystal 4 which floats on the liquid, and across which high frequency oscillations are impressed by the lead 18 connected to a metallic coating 21, and a lead 19, which is in contact with the mercury 17, through the wall of the vessel 16. The mercury acts as the other metallic facing of the crystal. Light from the source 6 is rendered parallel by the lens 20, and reflected from the surface of the mercury through the lens 22 which focuses an image of the source 6 on to the aperture 12 of the diaphragm 11. The waves on the surface of the mercury act in a similar manner to a normal reflecting diffraction grating, and produce scattering of the reflected beam, the amount of scattering being dependent upon the amplitude of the waves. The diffracted light is arrested by the diaphragm 11 and the modulated beam passes through the aperture 12.

In Fig. 5 is shown an alternative method of producing waves on the surface of a liquid, by the electrostatic attraction between the liquid 17 and a wire 23 running parallel to the surface of the liquid 17, and fixed a short distance above the surface. The high frequency oscillations are applied to the wires 19 and 23, and owing to alternating electrostatic attraction between the liquid 17 and the wire 23, waves are formed on the surface of the liquid 17. The optical arrangements used with this form of modulating device may be similar to those shown in Fig. 4.

In Fig. 6 is shown a modification of Fig. 5, where a transparent liquid 17 is used, the base of the vessel 16 also being of transparent material. Light, instead of being reflected from the surface of the liquid, passes through it. High frequency alternating potentials are applied across the wires 19 and 23 as in the case illustrated in Fig. 5, whereby waves are produced on the surface 25 of the liquid 17. Light from the source 6 passes up through the liquid, and the diffraction effects take place at the upper surface 25 of the liquid 17. The light is focused by the lens 24 on to the aperture 12 of the diaphragm 11.

In Fig. 7 is shown yet another method whereby modulation of a beam may be brought about by the formation of waves in its path. A thin silvered mica plate 30 has fixed to it at one edge a piezo-electric crystal 4, covered by metal plates or layers of gilding 3, these layers lying perpendicular to the electric axis of the crystal. Modulated high frequency potentials applied to the plates 3 produce in the crystal 4 vibrations which set up flexural waves in the plate 30. Light from a source 6 reflected from the plate 30 is collected by the lens 31 and focused on to the aperture 12 of the diaphragm 11. The flexural waves in the plate 30 cause diffraction effects in the beam of light from the source 6 in a manner similar to that of the preceding examples.

The waves may of course be produced otherwise than by means of the piezo-electric or electrostatic means so far described. For example waves, either flexural or compressional may be produced by mechanical means, e. g., by a vibrating tuning fork or similar device, or by an electro-magnetically operated diaphragm. Waves may also be produced by a metal rod vibrating in sympathy with electromagnetic impulses by virtue of its magnetostrictive properties, or by electrolytic means, for example, by alternate polarization and depolarization at an electrode immersed in a conducting solution when high frequency currents flow from it through the solution. It will be understood that the invention is not limited to the specific examples cited above, but that these examples serve to show how mechanical vibrations produced in a body located in an optical system may serve to produce modulation of a light beam according to the modulation of said waves. The wave bearing body may also be in the form of a transparent solid or gas.

It will now be explained how the present invention makes use of the phenomena which have been described with reference to Figs. 1 to 7 in order to obtain simultaneous modulation of different parts of a beam of light in accordance with a plurality of different varying influences.

Thus, as shown by way of example in Fig. 8, for a liquid cell which is a modification of that shown in Fig. 1, a boundary surface or line 35 may be provided inclined to the surface or line of origin 4 of the waves, whereby repeated reflections of the waves between this boundary and their origin produce a region or regions of resonance 37, 37', whose position may depend on the frequency of the mechanical waves. In this case two or more electrical frequencies may be applied simultaneously to the quartz crystal 4, or other wave-originating members, resulting in two or more corresponding distinct regions of effect in the wave-bearing body, so that the wave amplitudes in particular regions, and thereby the corresponding optical effects, may be modulated or controlled independently of those in other regions by modulating the appropriate electrical frequency or frequencies applied to the device. Thus the region 37 may correspond to one applied frequency and the region 37' to another.

Alternatively, barrier surfaces or lines of suitable material may be inserted in the wave bearing body at suitable intervals, either parallel or inclined to the surface or line of wave origin and/or to each other, whereby interference or resonance effects of the waves may be obtained resulting in localities of resonance as in the previous example.

Alternatively according to the invention, the wave-bearing body may have one or more boundaries or inserted barriers of periodic form, for example stepped boundaries or barries having regular apertures or variations of thickness, whereby the waves are diffracted in directions dependent upon their frequency. Such boundaries or barriers may if desired be curved, whereby a focusing effect may be attained resulting in the localization in the body of regions of effect dependent upon frequency.

Examples of how the above principles may be applied to the present invention are shown in Figs. 9 to 11.

In Fig. 9, high frequency potentials are applied to the terminals 5 connected to opposite sides of the piezo-electric crystal system 4. Mechanical waves of corresponding frequency are formed in the liquid 52, and are reflected from the plate 50, which has a serrated or ridged surface. This plate has the effect of diffracting the compressional waves in the liquid 52 in such a way that the direction in which they travel from the plate 50 depends upon the frequency of the waves. If high frequency alternating voltages of two different periodicities are applied to the terminals 5, the directions of the waves of maximum amplitude reflected from the plate 50 will be different as indicated by arrows 53 and 53' for example.

In order to differentiate optically between the sets of waves indicated by 53 and 53', which are travelling in different directions, light from the source 6 diverging from an aperture or slit 62' in a diaphragm 62 may be allowed to pass through the liquid. Then only those rays a, a' having directions nearly normal to the directions of waves 53, 53' respectively will be markedly affected by the waves. If the rays be then focussed by a lens 63 upon a slit 12 in a diaphragm 11, a sheaf of rays will issue from this slit, of which those will be modulated which have been affected by the waves as indicated above. A further positive lens 64 of suitable focus will produce on a screen 65 a band or line of light f, f' wherein the intensity at a position f' say, corresponds to the wave intensity in the liquid in a direction 53', and therefore to the intensity of a particular frequency component in the electrical impulses applied to the crystal 4. If therefore a number of different frequencies applied to crystal 4 are modulated with different sets of variations, each of these sets of variations will appear on the screen 65 in a different position, in the form of corresponding light modulations.

In Fig. 10 a vessel 51 containing a liquid 52, and having fixed at the bottom a piezo-electric crystal 4, has in it a grating 72, consisting of a number of fine wires stretched parallel to one another, at a distance of the order of the wavelengths of the waves to be transmitted in the liquid. This grating 72 will have an effect similar to that shown by the plate 50 in Fig. 11. Thus two high frequency potentials of different periodicity applied to the terminals 5 will give rise to two sets of waves in the liquid 52, travelling in the directions indicated by the arrows 53 and 53'.

If desired a lens 73, which may for example be of fused silica, indicated by the dotted lines, may be provided to focus the waves at desired points for example as indicated by the dotted lines 74 and 74' at points 75 and 75' on the surface of the liquid.

One way in which such an arrangement can be made use of will be described later with reference to Fig. 15.

In Fig. 11 is shown an apparatus according to the present invention, wherein effects similar to those produced in the apparatus of Fig. 9 are brought to a focus.

A piezo-electric crystal 4 forms part of the wall of a vessel 51; waves produced in the liquid 52 by the crystal 4 vibrating in sympathy with high frequency potentials applied to the terminals 5 are diffracted by the ridged plate 50, and are then reflected from the curved boundary 54 of the vessel 51, the curvature being such as to bring the waves to a focus at the point 56 on the surface 55 of the liquid 52. As the plate 50 has a different diffracting power for different wavelengths of compressional waves, the position of the focus on the liquid surface 55 is different for each set of wavelengths. In this way if two sets of high frequency potentials of different periodicity are applied to the terminals 83, 66 of the modulating system 68, the positions of resonance on the surface 55 of the liquid 52 will be different for each set of waves as indicated at 56 and 56'. Such positions of resonance may be used to modulate a light beam in the manner described above (for example in connection with Figs. 4 to 6) in accordance with modulations of the high frequency oscillations applied to terminals 83, 66. The resonance points 56 and 56' may equally well be in the body of the liquid 52, in which case they may be used to modulate a light beam passing through the liquid as in the example illustrated in Fig. 1.

In Fig. 12 is illustrated a further example according to the present invention whereby positions of resonance may be produced in a liquid. A vessel 51 containing a liquid 52 has a bottom constituted by a piezo-electric crystal 4 and a wedge-shaped block 57. If the crystal is made to vibrate by applying high frequency potentials to the terminals 5, compressional waves will be formed in the block 57 as described in connection with Fig. 8. Owing to its wedge-shaped form, points of resonance 58 will be set up, at places where the depth of the block is an integral number of wavelengths. These points of resonance 58 will set up in the liquid 52 wave trains 59 of corresponding wavelengths. The block 57 may for example be of steel or it may be replaced by mercury. In this case the vessel 51 would have to be tilted out of the vertical in order to give the mercury layer the necessary wedge-shape.

Devices such as have been described in connection with Figs. 8 to 12, in which there are produced regions of resonance or maximum effect dependent for their position or direction upon the frequency of the applied oscillations, are used according to the invention to produce simultaneously two or more modulated beams of light, the modulations being independent of one another.

In any form of the invention other than forms such as are indicated in Fig. 8 where standing waves are required, and particularly when the progressive motion of wave regions of different modulation intensities is imaged at a receiving surface as will hereinafter be described, means may be used to prevent or diminish the unwanted effects whereby standing waves might be produced as a result of reflection of the mechanical waves from boundaries of the wave-bearing body. Such means may for example comprise boundaries of the body so shaped that the reflected waves proceed in directions such that their optical effects are negligible with respect to the particular light beams used. Alternatively, means for damping the reflected waves may be provided, such as boundaries or barriers of materials of suitable physical characteristics. For example, in the case of a liquid along which compressional waves are propagated, a cork boundary may be placed in their path at a suitable distance from their source. Alternatively, the length of the wave bearing body may be such that the natural damping of the waves during their passage along or through it suffices to reduce to negligible amplitude any reflected waves which might otherwise produce undesirable effects.

Since in general the optical effects produced by the mechanical waves in this invention vary with the colour of the light employed, and since in many cases they vary also with the direction of incidence of the light on the wave-bearing body, the optical systems used with this invention in any of its forms may be so arranged that the spectral components of the colours of shorter wavelength (e. g. blue) which are most affected are incident upon the wave-bearing body at a different angle from those components of longer wavelength (e. g. red) which are less effected so that the inherent variation of effect on different colours is neutralised or deduced by variation in their angles of incidence. For example, in the simple case of a liquid or solid wave bearing body, of the kind described in connection with Fig. 12, the maximum effect is obtained when the light passes through the body 52 parallel to the mechanical wave front (e. g. perpendicular to the paper in Fig. 12). To secure the compensating effect described, the red components may be made to pass most nearly in this direction, and the other spectral components, in order, may be given directions of increasing deviation from it. One optical arrangement to secure this effect is shown in Fig. 13, which shows a pair of similar dispersing prisms of flint glass 93, 94 arranged one on each side of the wave-bearing body 13, so that the prism 93 on the incident side introduces a suitable degree of dispersion in the beam of light before its passage through the wave bearing body, this dispersion being neutralised afterwards by the second prism 94. If desired, the prisms may be in optical contact with the body. By suitable modifications, such a system may be used in conjunction with any of the modulating devices of the present invention.

In an analogous way correction may be obtained for the variation in optical effect along the length of the wave bearing body due to damping of the waves as they proceed along it, or in some cases due to variation in the effective area of the wave front. In the case of damping, the optical effect is inherently greater near the origin of the waves than at a distance from it. The optical arrangement may then be such that at the point of greatest wave amplitude the direction of incidence of the light is inclined to that giving maximum optical effect and that this inclination is progressively reduced for the regions of decreasing amplitude. In the simple cases first described, where the waves are produced in liquid or solid bodies, the direction of maximum effect is usually constant throughout the length of the wave bearing body. The compensating effect described is then attainable by using a light beam which is slightly divergent or convergent and incident on the wave bearing body at an angle to the normal so that in the region of maximum wave amplitude the direction of its rays is more inclined to the mechanical wave front than in the region of minimum amplitude. This compensating effect can be brought about simply by focusing and is most conveniently incorporated in the whole associated optical system, by using lenses of appropriate powers. If it is desired, however, to work with parallel beams, it may be attained in the manner shown in Fig. 14, where there is provided on one side of the body 13 a lens 96 of positive power and on the other side a lens of slightly greater negative power 97, a parallel beam of light being directed upon the combination at a suitable angle. The beam will then be rendered convergent by the lens 96 during its passage through the wave bearing body, and parallel again afterwards by the lens 97. Clearly by exchanging the positions of the lenses 96 and 97 the beam may be made divergent within the body 13.

The above described correction for damping effects and that previously described for making the system achromatic, may be applied together in the device if desired, either in the forms described or in any other suitable way, according to conditions.

An important application of the invention is connected with the fact that the mechanical waves which cause diffraction effects travel with a finite velocity along the body in which they act. If therefore this body be long enough in the direction of travel and if the waves be modulated in intensity sufficiently quickly, there may be present, at any moment, regions of different intensity of modulation in different parts of the body, those regions themselves moving at about the speed of propagation of the waves. If it be desired to apply simultaneously to a given spot all the light controlled by the device, this fact may limit the permissible length of wave-bearing body that can be used. In cases, however, where the effective position of application of the controlled light is required to change with time, as for example in the production of a television picture by scanning, this above mentioned fact permits of advantageous application in the manner set forth in my copending application Serial Number 128,195, filed February 27, 1937.

It is desired to point out that in the cases illustrated in Figs. 4, 5, 6, 10 and 11 the frequencies suitable for producing ripples on the liquid surface are in general lower than those suitable for compressional waves in the liquid. In these cases where ripples are used, therefore the high frequency potentials of different periodicities, whose application to the piezo-electric crystal results in regions of resonance on the liquid surface (referred to for convenience as $F_1$, $F_2$, etc.) may be modulated simultaneously at a lower frequency (say $f$) appropriate to the generation of ripples on the liquid surface.

Such modulations may be obtained as shown in Fig. 11 where high frequencies $F_1$, $F_2$ modulated by signals, say of frequencies $m_1$, $m_2$ respectively, are applied to the terminals 83 and 66, and the lower frequency $f$ is applied to the terminals 67. The frequencies $F_1$, $F_2$ modulated respectively with frequencies $m_1$ and $m_2$ will both be modulated also with frequency $f$ and the resultant signal will appear at the terminals 5, and will therefore be applied to the plates 3 of the piezo-electric crystal 4.

The mode of generation of ripples is then as follows:

At each point (for instance 56, 56' of Fig. 11) on the liquid surface where a resonance is focused, the concentration of high frequency energy results in an upward pressure on the liquid surface. Owing to the modulation of the high frequencies $F_1$, $F_2$ etc. by a lower frequency $f$ appropriate to ripple formation, this pressure varies at the said lower frequency $f$, giving rise to ripples or waves on the liquid surface which may be applied to light modulation in the manner previously described. The further modulation of $F_1$ and $F_2$ at frequencies $m_1$, $m_2$ which are lower than the ripple frequency, will then give rise to modulation of corresponding sets of ripples on the liquid surface and thereby of the corresponding light intensities.

While the invention is applied to television, the scanning devices used may be of any suitable type. In cases where all the lines of the picture are scanned simultaneously, a convenient form of scanner is a simple mirror drum, with all the mirrors parallel to the axis. Where only a fraction of the total number of lines is simultaneously scanned, mirror drums may be used having mirrors with progressively different inclinations to the axis, so that each set of lines, in turn, may be projected in its appropriate position on the receiver screen.

Thus devices according to the present invention, or combinations of them, may be used in television to translate into a picture a television signal comprising several high frequency components simultaneously present, each modulated in accordance with impulses representing the light distribution of a particular line or part of the scene transmitted. These devices may also be employed in any cases where it is required to form a line or pattern of light having intensities in particular parts corresponding to the intensities of particular frequency components in a complex periodic signal.

Certain of the devices hereinbefore described such as that shown in Fig. 8 may be applied at the transmitter of a television system to facilitate the production of signals containing a multiplicity of modulated frequencies.

Clearly in light modulating devices according to this invention instead of selecting the central part of the beam by an apertured diaphragm, the outer part of the beam may be used if desired. For this purpose the diaphragm is arranged to stop off the central part of the beam and allow the outer part to pass on to the utilisation point. Both the central and the outer portions can be used separately, if desired, since both are modulated. Since the modulation is in opposition the two portions cannot be used together.

I claim:

1. Apparatus for controlling the intensity of a beam of light in accordance with a plurality of mechanical carrier waves of different frequencies, said apparatus comprising a body capable of transmitting mechanical waves to produce diffraction grating effects, means for applying to said body a complex mechanical vibration comprising a mixture of carrier waves to cause said complex mechanical vibration to traverse said body, means for acting selectively on carrier waves of different frequencies in said mixture traversing said body to cause each of said carrier waves to follow a path in said body which is spacially separated from the paths of the others of said carrier waves and means for directing light of a beam upon the carrier waves in each of said paths to control simultaneously and independently of one another the intensity of spacially separated parts of said light beam.

2. Apparatus for controlling the intensity of a beam of light in accordance with the modulations of a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves causing said complex mechanical vibration to traverse said body, means for acting selectively on carrier waves of different frequencies in said mixture traversing said body to cause each of said carrier waves to follow a path in said body which is spacially separated from the paths of the others of said carrier waves, and means for directing light of a beam upon the carrier waves in said paths to vary simultaneously but independently the intensity of spacially separated parts of said light beam in accordance with the respective modulations of said carrier waves.

3. Apparatus for controlling the intensity of a beam of light in accordance with the modulations of a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves of different high frequencies causing said complex mechanical vibration to traverse said body, means for resonating spacially separated paths in said body at different frequencies whereby said carrier waves can set up in said body regions of maximum wave intensity, the region of maximum wave intensity set up by one of said frequencies being spacially separated from that set up by another of said frequencies, and means for directing light of a beam upon the carrier waves in said regions to vary simultaneously but independently the intensity of spacially separated parts of said light beam in accordance with the respective modulations of said carrier waves.

4. Apparatus for controlling the intensity of a beam of light in accordance with a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves causing said complex mechanical vibration to traverse said body, means for resonating spacially separated paths in said body at different frequencies whereby said carrier waves can set up in said body regions of maximum wave intensity, the region of maximum wave intensity set up by one of said frequencies being spacially separated from that set up by another of said frequencies, means for utilising the carrier waves in said regions to cause mechanical waves to traverse a second wave-bearing body in spacially separated paths, means for directing light from said beam simultaneously upon said paths in said second body to produce diffraction of the light in accordance with the modulation of the carrier wave in each path, and means for separating the diffracted light emergent from said second body from the undiffracted light, thereby obtaining a light beam having each of a plurality of spacially separated parts thereof modulated in accordance with one of said varying influences.

5. Apparatus for controlling the intensity of a beam of light in accordance with a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves causing said complex mechanical vibration to traverse said body, means to cause waves of different frequencies of said carrier waves to travel in selected different directions in said body, and means for directing light of a beam upon the paths of said selected carrier waves to vary simultaneously but independently the intensity of spacially separated parts of said light beam in accordance with the respective modulations of said carrier waves.

6. Apparatus for controlling the intensity of a beam of light in accordance with a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves of different high frequencies causing said complex mechanical vibration to traverse said body, means to cause waves of different frequencies of said carrier waves to travel in different selected directions in said body, means for directing light from said beam simultaneously upon said selected carrier waves to produce diffraction of the light in accordance with the modulations of the carrier waves, and means for separating the diffracted light from the undiffracted light, thereby obtaining a light beam having each of a plurality of spacially separated parts thereof modulated in accordance with one of said varying influences.

7. Apparatus for controlling the intensity of a beam of light in accordance with a plurality of mechanical carrier waves of different frequencies, said apparatus comprising a body capable of transmitting mechanical carrier waves to produce diffraction grating effects, means for applying to said body a complex mechanical vibration comprising a mixture of modulated carrier waves causing said complex mechanical vibration to traverse said body, means to cause waves of different frequencies of said carrier waves to travel in different selected directions in said body to produce spacially separated regions of disturbance on a surface of said body, and means for directing light of a beam upon surface ripples from each of said regions of disturbance to control the intensity of a part of said light beam in accordance with the modulations of said carrier waves.

8. Apparatus for controlling the intensity of a beam of light in accordance with the modulations of a plurality of carrier waves, comprising a body capable of transmitting said modulated carrier waves to produce diffraction grating effects, means for applying to said body a mixture of modulated carrier waves to cause said waves to traverse said body, a frequency discriminating surface arranged to intercept said mixture of waves and having means for causing waves of different frequencies to follow different paths in said body, said paths being spacially separated from one another, and means for simultaneously directing spacially separated parts of a light beam respectively upon said paths of said waves to control the intensities of said parts of the light beam independently of one another.

9. Apparatus for modulating the intensity of a beam of light in accordance with the modulations of a mechanical carrier wave, comprising a body having a surface to be located in the path of a light beam, said body being capable of transmitting a mechanical carrier wave to form ripples on said surface capable of producing a diffraction grating effect, means for applying a modulated carrier to said body to produce ripples on said surface and thereby to diffract a part of a light beam falling thereon, thereby varying the intensity of said part in accordance with modulation of said carrier wave, and means arranged in the path of light emergent from said surface for separating said diffracted part from the remainder thereof.

10. Apparatus for modulating the intensity of a beam of light in accordance with the modulations of a mechanical carrier wave, comprising a body having a light reflecting surface to be located in the path of a light beam, said surface being capable of transmitting said mechanical carrier wave in the form of ripples to produce a diffraction grating effect, means for applying a modulated carrier to said body to produce ripples on said surface and thereby to diffract a part of a light falling on and reflected from said surface, thereby the intensity of said part is varied in accordance with modulation of said carrier wave, and means arranged in the path of reflected light emergent from said surface for separating said diffracted part from the remainder thereof.

11. Apparatus for modulating the intensity of a beam of light in accordance with the modulations of a mechanical carrier wave, comprising an optically transparent body having a surface to be located in the path of light and capable of transmitting a mechanical carrier wave to said surface to form ripples and to produce a diffraction grating effect, means for applying a modulated carrier to said body to produce ripples on said surface and thereby to diffract a part of light emergent from said body, and means arranged in the path of the light emergent from said body for separating said diffracted part from the remainder thereof.

12. Apparatus for modulating a beam of light in accordance with applied variations, comprising a body having a surface capable of transmitting mechanical waves and to be located in the path of a light beam, means for applying to said body a mechanical oscillation modulated with said variations to generate on said surface ripples of the same frequency as said mechanical oscillation and modulated with said variations to produce diffraction grating effects, said ripples serving to diffract a part of the light beam when directed upon said surface, and means for separating said part of such a light beam from the remainder thereof.

13. Apparatus for modulating a beam of light in accordance with applied variations, comprising a body having a light reflecting surface capable of transmitting mechanical waves and to be located in the path of a light beam, means for applying to said body a mechanical oscillation modulated with said variations to generate on said surface ripples of the same frequency as said mechanical oscillation and modulated with said variations to produce diffraction grating effects, said ripples serving to diffract a part of a light beam when directed upon and reflected from said surface, and means for separating a diffracted part of such a reflected light beam from the remainder thereof.

14. Apparatus for modulating a beam of light in accordance with applied variations, comprising a light source, an optical transparent body having a surface capable of transmitting mechanical waves located in the path of light from said source, means for applying to said body a mechanical oscillation modulated with said variations to generate on said surface ripples of the same frequency as said mechanical oscillation and modulated with said vairations to produce diffraction grating effects, said ripples serving to diffract a part of the light incident upon said ripples, and means for separating said diffracted part of said light from the remainder thereof.

JOHN HENRY JEFFREE.